US008275968B2

(12) United States Patent
Bacik

(10) Patent No.: US 8,275,968 B2
(45) Date of Patent: Sep. 25, 2012

(54) MANAGING UNALLOCATED STORAGE SPACE USING EXTENTS AND BITMAPS

(75) Inventor: Josef Michael Bacik, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 284 days.

(21) Appl. No.: 12/628,137

(22) Filed: Nov. 30, 2009

(65) Prior Publication Data

US 2011/0131387 A1 Jun. 2, 2011

(51) Int. Cl.
*G06F 12/06* (2006.01)

(52) U.S. Cl. .................. 711/171; 711/E12.007

(58) Field of Classification Search ............ 711/170, 711/171, 212, E12.007
See application file for complete search history.

(56) References Cited

U.S. PATENT DOCUMENTS

| 5,713,002 | A  | * | 1/1998  | Zbikowski et al. | ......... 711/112 |
| 6,237,072 | B1 | * | 5/2001  | Houlsdworth | ............... 711/171 |
| 6,658,437 | B1 | * | 12/2003 | Lehman | ............................ 1/1 |
| 2002/0144073 | A1 | * | 10/2002 | Trainin et al. | ............... 711/170 |
| 2005/0086449 | A1 | * | 4/2005  | Zavitaev | ..................... 711/170 |
| 2009/0276602 | A1 | * | 11/2009 | Chedru | ....................... 711/171 |

OTHER PUBLICATIONS

Wang et al., "OBFS: A File System for Object-based Storage Devices," 21st IEEE / 12th NASA Goddard Conference on Mass Storage Systems and Technologies, College Park, MD, Apr. 2004.*

* cited by examiner

*Primary Examiner* — Hal Schnee
(74) *Attorney, Agent, or Firm* — Lowenstein Sandler PC

(57) ABSTRACT

A computing device executing a file system maintains a search tree that includes extents for managing first regions of unallocated storage space and bitmaps for managing second regions of unallocated storage space. For each region of unallocated storage space, the file system determines whether to manage that region using an extent or a bitmap based on one or more space management criteria.

21 Claims, 5 Drawing Sheets

MANAGING UNALLOCATED STORAGE SPACE USING EXTENTS AND BITMAPS

TECHNICAL FIELD

Embodiments of the present invention relate to memory management, and more particularly, to managing unallocated storage space using a combination of extents and bitmaps.

BACKGROUND

When an application running on a computer system needs disk space, it requests a region of specified size from a file system included in the computer system. The file system manages unallocated storage space, and may use a data structure stored in primary memory (e.g., random access memory (RAM)) to determine what storage space to allocate to the application to satisfy the request. However, in typical file systems, such data structures consume a considerable amount of primary memory.

BRIEF DESCRIPTION OF THE DRAWINGS

The present invention is illustrated by way of example, and not by way of limitation, in the figures of the accompanying drawings and in which.

DETAILED DESCRIPTION

Figure 1:
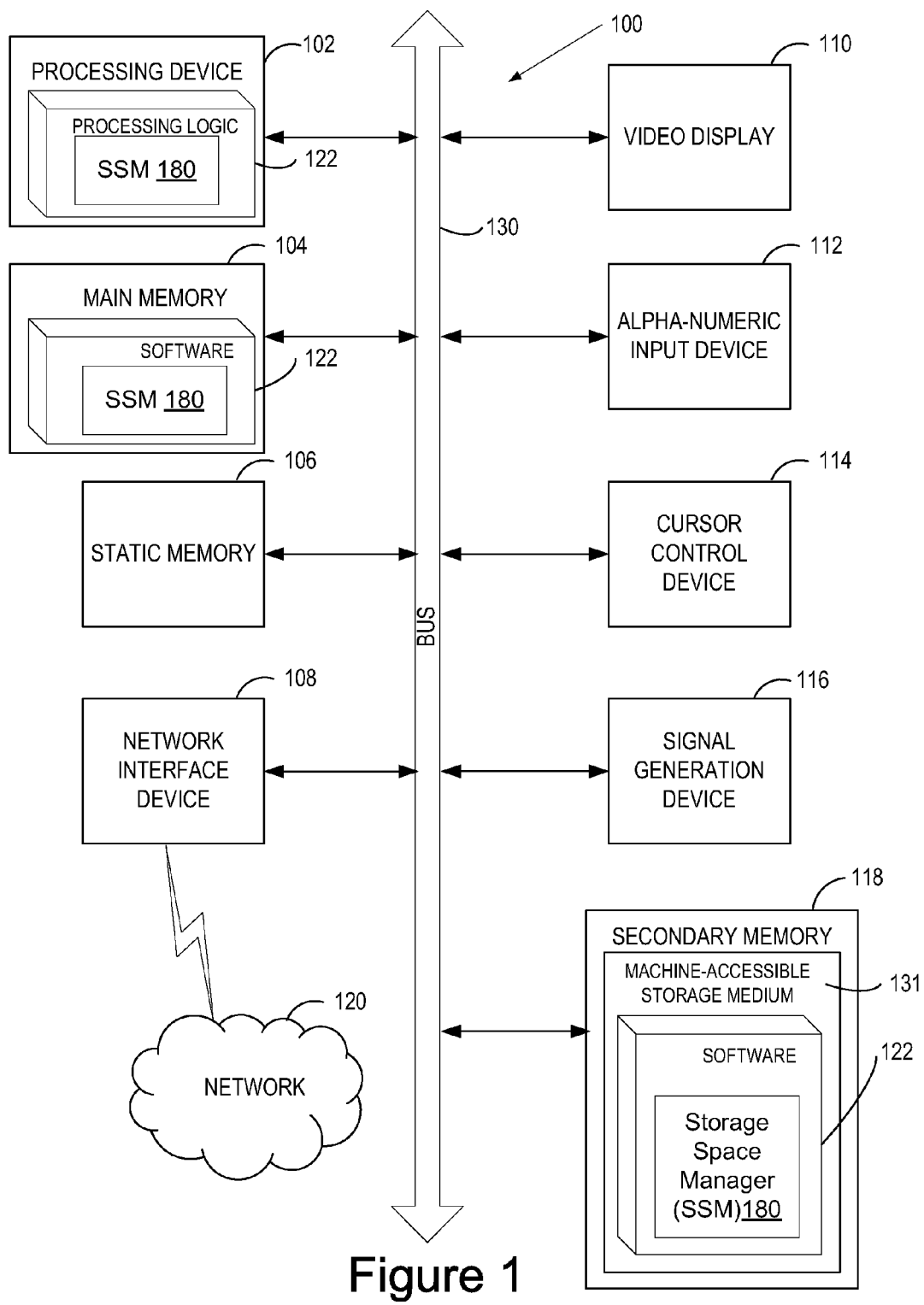
FIG. 1 illustrates a diagrammatic representation of a machine in the exemplary form of a computer system, in accordance with one embodiment of the present invention.

Described herein is a method and apparatus for managing allocation of free (unallocated) storage space. In one embodiment, a computing device executing a file system maintains a search tree that includes extents for managing first regions of unallocated storage space and bitmaps for managing second regions of unallocated storage space. For each region of unallocated storage space, the file system determines whether to manage that region using an extent or a bitmap based on one or more space management criteria. Examples of space management criteria include a size threshold and an extent entries threshold. In one embodiment, regions that are smaller than the size threshold are managed by bitmaps. In one embodiment, if the total number of extent entries included in the search tree when a region is received exceeds the extent entries threshold, the region is managed by a specific bitmap.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

FIG. 1 illustrates a diagrammatic representation of a machine in the exemplary form of a computer system 100 within which a set of instructions, for causing the machine to perform any one or more of the methodologies discussed herein below, may be executed. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a processing device 102, a main memory 104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a secondary memory 118 (e.g., hard disk drive, optical drive, etc.), which communicate with each other via a bus 130.

The processing device 102 represents one or more general-purpose processing devices such as a microprocessor, central processing unit, or the like. More particularly, the processing device 102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 102 may also be one or more special-purpose processing devices such as an application specific integrated circuit (ASIC), a field programmable gate array (FPGA), a digital signal processor (DSP), network processor, or the like. The processing device 102 is configured to execute the processing logic 122 for performing the operations and steps discussed herein below.

The computer system 100 may further include a network interface device 108. The computer system 100 also may include a video display unit 110 (e.g., a liquid crystal display (LCD) or a cathode ray tube (CRT)), an alphanumeric input device 112 (e.g., a keyboard), a cursor control device 114 (e.g., a mouse), and a signal generation device 116 (e.g., a speaker).

The secondary memory 118 may include a machine-accessible storage medium 131 on which is stored one or more sets of instructions (e.g., software 122) embodying any one or more of the methodologies or functions described herein. The software 122 may also reside, completely or at least partially, within the main memory 104 and/or within the processing device 102 during execution thereof by the computer system 100, the main memory 104 and the processing device 102 also constituting machine-accessible storage media.

In one embodiment of the present invention, at least a portion of the secondary memory 118 is managed memory. Managed memory is allocated and deallocated according to the needs of one or more applications (programs) and/or an operating system. Means for managing portions of secondary memory 118 may be implemented in hardware, software, or a combination thereof. In one embodiment, the means for managing secondary memory 118 is a storage space manager (SSM) 180 that may be included in a file system. The storage space manager 180 may be responsible for assigning (allocating) and freeing (deallocating) portions of secondary memory 118, and/or for making calls to the general purpose memory allocation library that do so. The storage space manager 180 may be included in one or more of the processing logic 122, main memory 104 or secondary memory 118.

While secondary memory 118 and main memory 104 are each shown in an exemplary embodiment to be single mediums, each should be taken to include a single medium or multiple media (e.g., a centralized or distributed database, and/or associated caches, registers, etc.) that store the one or more sets of instructions.

Each of the main memory 104 and the secondary memory 118 may include a machine accessible storage medium, which shall be taken to include any medium that is capable of storing or encoding a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Figure 2A:
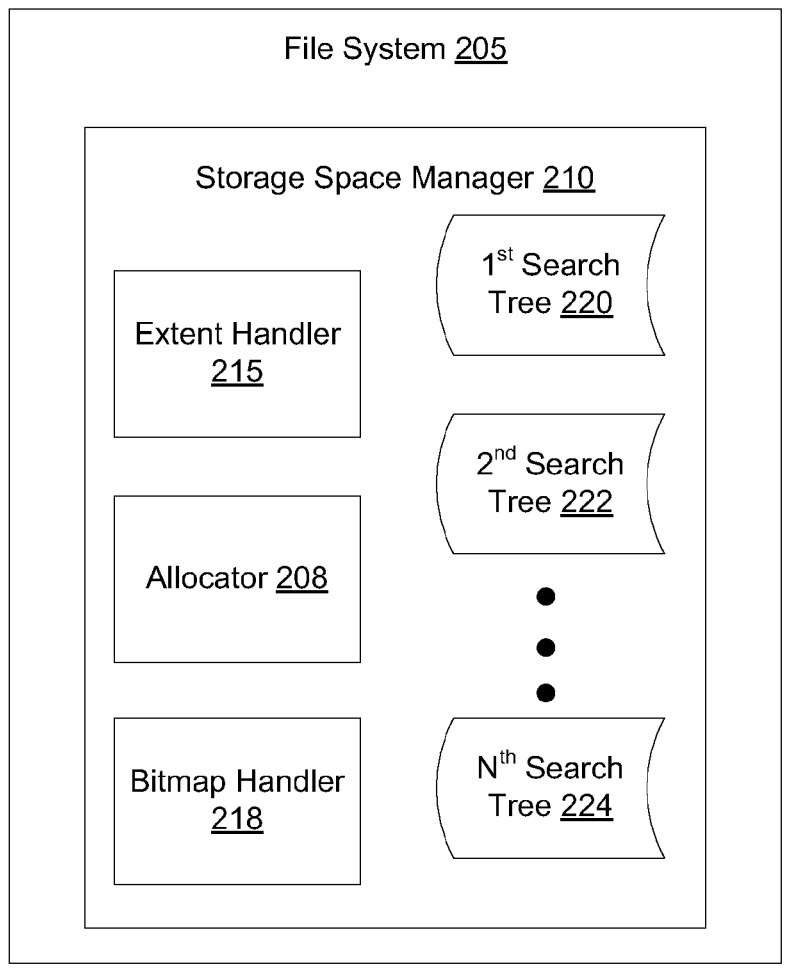
FIG. 2A illustrates a block diagram of one embodiment of a file system, which performs an aspect of memory management for secondary storage.

FIG. 2A illustrates a block diagram of one embodiment of a file system 205, which performs an aspect of memory management for secondary storage (e.g., hard disk drives, solid state drives, etc.). Note that though the following description refers to a file system, embodiments of the present invention can also be used to manage unallocated storage space in a database management system.

In one embodiment, file system 205 includes a storage space manager 210, which may reside in computer system 100 of FIG. 1. Storage Space Manager 210 is responsible for assigning (allocating) and freeing (deallocating) regions of storage space, and/or for making calls to a general purpose memory allocation library that do so. The storage space manager 210 may be implemented in hardware, software, or a combination thereof. In one embodiment, the storage space manager 210 manages at least portions of the secondary memory 118 of FIG. 1.

Referring to FIG. 2A, in one embodiment, the storage space manager 210 includes an allocator 208, an extent handler 215, a bitmap handler 218, and a collection of search trees (e.g., $1^{st}$ search tree 220, $2^{nd}$ search tree 222 through nth search tree 224). The storage space manager 210 conceptually divides storage space into multiple block groups, and generates a separate search tree for managing each block group. Each search tree may be maintained in main memory.

Storage space is typically divided into fixed size blocks, which are sequences of bytes or bits. A block may be the smallest unit of storage space that is allocated/managed. Typical block sizes include 1 kb, 2 kb, 4 kb and 8 kb. A block group is a sequence of blocks.

Figure 2B:
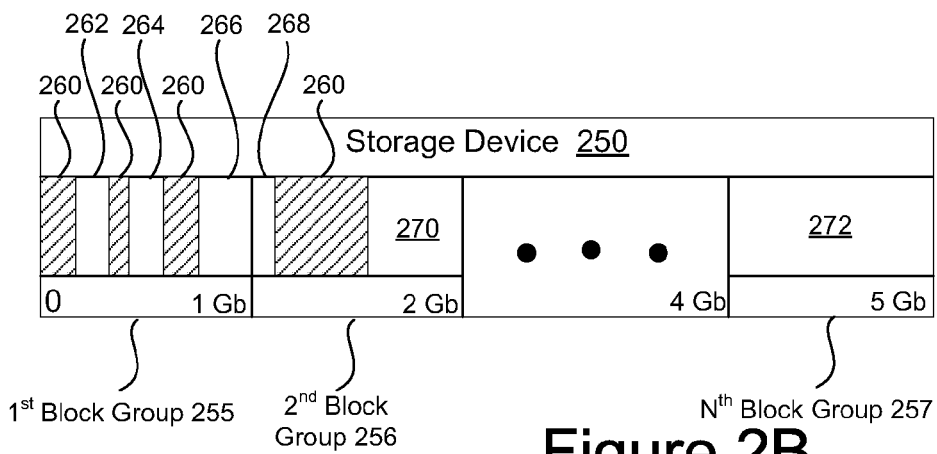
FIG. 2B illustrates a storage device that has been conceptually divided into multiple block groups, in accordance with one embodiment of the present invention.

FIG. 2B illustrates a storage device 250 that has been conceptually divided into multiple block groups (e.g., $1^{st}$ block group 255, $2^{nd}$ block group 256 through nth block group 257), each of which is 1 Gb large, and which has an offset that begins at the end of the preceding block group. For example, first block group starts at offset 0 and ends at offset 1 Gb, second block group 256 starts at offset 1 Gb and ends at offset 2 Gb, and nth block group 257 starts at offset 4 Gb and ends at offset 5 Gb. The block groups 255, 256, 257 may each be the same size (e.g., 1 Gb as shown), or different block groups may have different sizes. Moreover, the block groups may have fixed or variable sizes and boundaries.

First block group 255 and second block group 256 each include one or more allocated regions of storage space 260, each region containing one or more blocks. First block group 255 further includes three regions of unallocated storage space 262, 264, 266. Second block group 256 further includes two regions of unallocated storage space 268, 270, and nth block group 257 includes one region of unallocated storage space 272. As storage space from block groups 255, 256, 257 is allocated and deallocated, the search trees that manage those block groups are updated.

Each search tree includes a root and one or more levels of nodes that branch out from the root. The root and each node include an entry for managing a region of unallocated storage space. In one embodiment, entries in the search trees are indexed on offsets (starting bytes of the entries). In one embodiment, each of the search trees is a binary search tree. In a further embodiment, each of the search trees is a self-balancing binary search tree. Therefore, as entries are added and subtracted from search trees, the search trees automatically rearrange themselves to keep their height (number of levels below the root) small after arbitrary insertions and deletions. Examples of self-balancing binary search trees include red-black trees, Arne Anderson (AA) trees, Andelson-Velski and Landis (AVL) trees, Scapegoat trees, Splay trees, etc.

Entries of search trees may be extent entries or bitmap entries. Extent entries manage regions of unallocated contiguous storage space of arbitrary size. Each extent entry includes a starting offset that identifies the location where the managed region of unallocated storage space starts, and a length of the region. The length may be represented in bytes or in numbers of blocks. Alternatively, each extent entry may identify the starting offset and the ending offset of the unallocated region. In one embodiment, an extent entry has a maximum size (length) that is equivalent to the size of the block group within which the region falls.

Bitmap entries manage regions of unallocated storage space within fixed offset boundaries. The regions of unallocated storage space managed by a bitmap do not need to be contiguous. Each bitmap entry includes an offset at which the bitmap is located, and a value representing the total amount of free space managed by the bitmap. Additionally, each bitmap describes which blocks are allocated and which are unallocated within the fixed offset boundaries of the bitmap. Bitmaps and bitmap generation are discussed in greater detail below.

Figure 2C:
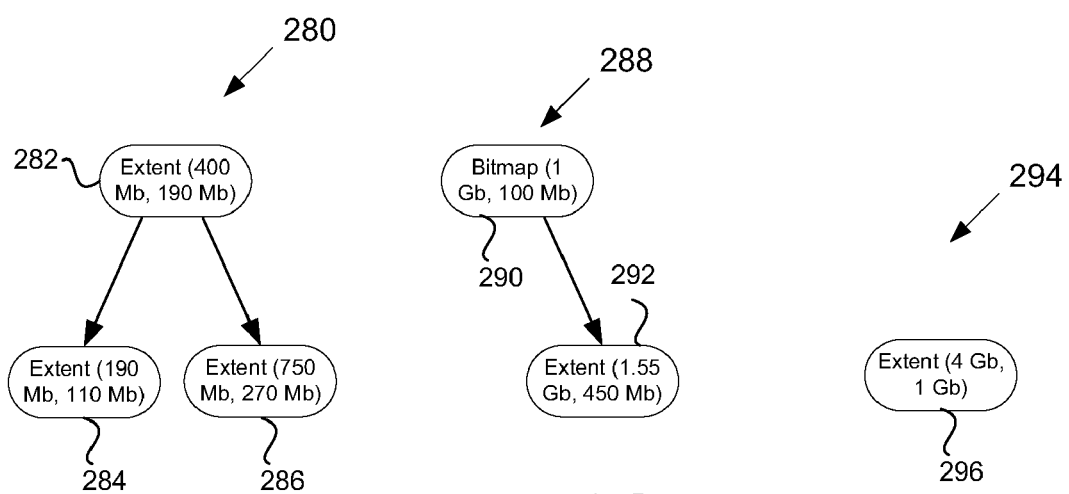
FIG. 2C illustrates multiple search trees, in accordance with embodiments of the present invention.

FIG. 2C illustrates a first search tree 280, second search tree 288 and nth search tree 294 that in one embodiment are used to manage first block group 255, second block group 256 and nth block group 257 of FIG. 2B, respectively. In one embodiment, first search tree 280, second search tree 288 and nth search tree 294 correspond to first search tree 220, second search tree 222 and nth search tree 224 of FIG. 2A, respectively. As illustrated, first search tree 280 includes three separate extent entries 282, 284, 286, which correspond to unallocated regions 262, 264 and 266, respectively. Extent entry 282 shows that region of unallocated space 264 starts at offset 400 Mb, and has a length of 190 Mb. Extent entry 284 shows that region 262 starts at offset 190 Mb and has a length of 110 Mb. Extent entry 286 shows that region 266 starts at offset 750 Mb and has a length of 270 Mb.

Second search tree 288 includes a bitmap entry 290 that is located at offset 0 Mb and an extent entry 292 that is located at offset 550 Mb. The bitmap entry 280 includes an offset at which the bitmap is located (0 Mb), and a value representing the total amount of free space managed by the bitmap (100 Mb). The bitmap entry 290 may include one or more bits for identifying region of unallocated space 268 and/or portions of region of allocated space 260 following region of unallocated space 268. The extent entry 292 manages region of unallocated space 270. Since nth block group 257 is empty, third search tree 294 includes a single extent entry 296 that manages region of unallocated space 272.

Returning to FIG. 2A, when file system 205 receives a request to allocate free storage space of a specified size, allocator 208 searches through the search trees 220, 222, 224 to find a region of unallocated space having at least the specified size. In one embodiment, requests to allocate free storage space include a size and a starting offset. In one embodiment, allocator 208 includes a request size threshold. If a request to allocate free space specifies a size greater than the request size threshold, the request may be divided into multiple requests, each of the requests having a size that is equal to or smaller than the request size threshold. In one embodiment, the request size threshold is the size of a block group. In another embodiment, the request size threshold is smaller than the size of a block group (e.g., a 1 Gb block group may have a request size threshold of 128 Mb).

Allocator 208 may start searching at the designated offset for a region of unallocated storage space having at least the specified size. In one embodiment, allocator 208 navigates (traverses the entries of) search trees linearly, from an entry having a smallest offset (or from a specified offset) to an entry having a largest offset in the search tree. In one embodiment, allocator 208 begins searching/navigating the search tree that manages the region having the specified offset. If a region having the specified size is not found in that search tree, allocator 208 progresses to a next search tree and searches through that search tree. This continues until allocator 208 finds a region that has at least the specified size. Once such a region is found, that region (or a portion of that region) is allocated to the requestor.

The following example shows a search through the search trees of FIG. 2C for a region that is 300 Mb long and has an offset of 500 Mb or higher. Upon receiving an allocation request for such a region from a requestor, allocator 208 begins searching for a region to allocate to the requestor in first search tree 280 at extent entry 282. Extent entry 282 represents an unallocated region that is 190 Mb, and so is too small. Therefore, allocator 208 navigates to extent entry 286, which is also too small. No regions having at least the specified size are included in search tree 280, so allocator 208 next searches search tree 288. Bitmap entry 290 shows that there are no consecutive regions of unallocated space having a combined size of 300 Mb managed by the bitmap. The allocator 208 therefore navigates to extent entry 314, and identifies a region of unallocated space starting at offset 1.55 Gb having a length of 450 Mb. This region of unallocated space meets the specified criteria of an at least 300 Mb size and offset at or after 500 Mb. Therefore, allocator 208 may allocate the region managed by extent entry 292 to the requestor, and delete extent entry 292 from search tree 288.

When an extent entry is found that will satisfy an allocation request, if the entry has a length that is equal to the specified size, the entire region managed by the extent entry is allocated to the requestor. However, if the extent entry manages a region that is larger than the specified size, the allocator 108 may divide the region into a first region having the specified size and a second region having any remainder storage space. The allocator 108 may then cause a new bitmap entry or a new extent entry to be generated to manage that region of free space, or update an existing bitmap entry to manage the region of free space. Alternatively, the requestor may be allocated the entire region, and may then return the unused storage space, at which point the allocator 108 may cause the returned region of unallocated storage space to be managed by a new bitmap entry, existing bitmap entry or new extent entry.

In the previous example, the requestor only requested 300 Mb of storage space, but a region having 450 Mb of storage space was found to satisfy the allocation request. Therefore, in one embodiment the allocator 108 would divide the 450 Mb region into a 300 Mb region and a 150 Mb region. The 300 Mb region would be allocated to the requestor, and a new extent entry would be added to second search tree 310 (e.g., at offset 1.85 Gb) for managing the 150 Mb region of unallocated storage space.

Each search tree is stored in main memory, and therefore reduces the amount of main memory available for other data. A search tree consumes approximately the amount of memory that the sum of the extent entries and bitmap entries included in that search tree consume. A bitmap entry has a size that is approximately equal to the memory page size. In one embodiment, bitmap entries have a size of approximately 4 kb. The size of an extent entry is approximately equal to the number of bits that are used to represent the offset and the number of bits used to represent the length. In one embodiment, the offset and length of the extent entry are each represented using an 8 byte value. Therefore, extent entries are approximately 16 bytes long in one embodiment. In order to minimize the amount of main memory that is used for search trees, management criteria are used to determine an optimized composition of extent entries and bitmap entries of those search trees.

In one embodiment, when file system 205 receives a region of unallocated space (e.g., a region that has recently been freed), allocator 208 determines which search tree should manage the region of unallocated space, and whether the region should be managed by an extent or a bitmap. Extents are faster to search, but bitmaps can use less space to describe a fragmented region of free space. Allocator 208 may make the determination of whether to manage the region of unallocated space using an extent or a bitmap by applying one or a collection of management criteria to the region.

In one embodiment, the management criteria include a continuity criterion. The continuity criterion is satisfied if the newly received region of unallocated storage space is contiguous with a preexisting region of unallocated storage space that is managed by an extent entry. In one embodiment, when allocator 208 receives a new region of free space, it compares the offset and length of that region to offsets and lengths of surrounding regions of free space. If the new region starts where an existing region of free space managed by an extent ends, then that extent entry is modified by adding the length of the new region to the length of that extent entry. Similarly, if the new region ends where an existing region begins, the extent entry managing the existing region is modified by changing its offset to the offset of the new region, and adding the length of the new region to the length of the extent entry. For example, if the new region has an offset of 400 Mb and a length of 100 Mb, and an existing entry has an offset of 500 Mb and a length of 100 Mb, the existing entry would be modified by changing its offset to 400 Mb and its length to 200 Mb.

In one embodiment, the management criteria include a region size threshold and/or an extent entries threshold. If the region is smaller than the region size threshold, then the allocator 208 determines that the region should be managed by a bitmap, and forwards the region to bitmap handler 218. If, when the region is received, the number of extent entries in the search tree that will manage the region exceeds the extent entries threshold, the region will be managed by a bitmap, and allocator 208 forwards the region to bitmap handler 218. In one embodiment, if the region is larger than the region size threshold, and the number of extent entries is smaller than the extent entries threshold, the allocator 208 forwards the region to extent handler 215.

In one embodiment, a search tree size threshold is applied to search trees. The search tree size threshold is used to ensure that search trees do not consume more than an allotted amount of main memory. In one embodiment, the search tree size threshold is set to 32 kb for search trees that manage unallocated storage space for a 1 Gb block group. However, other search tree size thresholds may also be used. The search tree size threshold may be divided into an amount of memory dedicated to bitmap entries and an amount of memory dedicated to extent entries. The amount of memory that is dedicated to each type of entry may change as the contents of the search tree changes.

In one embodiment, the amount of the search tree size threshold that is dedicated to extent entries for a particular search tree is computed as the extent entries threshold. The extent entries threshold determines the maximum number of extent entries that can be included in the search tree. In one embodiment, the extent entries threshold is calculated dynamically, and is based on the number of bitmap entries included in the search tree.

In one embodiment, approximately 16 kb of memory is allotted for use by extent entries, and approximately 16 kb of memory is allotted for use by bitmap entries when a search tree is first generated. As long as there are 4 or fewer bitmaps (each taking up approximately 4 kb), approximately 16 kb of memory is dedicated for use by extent entries. If an extent entry is approximately 16 bytes, this means that the extent entries threshold is initially approximately 1000 extent entries. However, when more than 4 bitmap entries are used, less memory is dedicated to extent entries. For example, when there are 5 bitmaps (e.g., each consuming 4 kb of space, for a total amount of 20 kb), then only 12 kb of memory is left for use by extent entries (an extent entries threshold of about 750). When there are 6 bitmaps (for a total of 24 kb), then only 8 kb of memory can be used by extent entries (an extent entries threshold of about 500), and so on.

In one embodiment, the extent entries threshold can be computed using the following algorithm:

$$E_{Threshold} = \frac{T_{Threshold} - B_{size} \cdot B_{quantity}}{E_{size}} \quad \text{(equation 1)}$$

where $E_{threshold}$ is the extent entries threshold (in number of extent entries), $T_{threshold}$ is the search tree threshold (in kb), $B_{size}$ is the size of a bitmap entry (in kb), $B_{quantity}$ is the number of bitmap entries in the search tree, and $E_{size}$ is the size of an extent entry (in bytes). In one embodiment, allocator 208 computes the extent entries threshold (e.g., using equation 1) each time a region of unallocated space is received. Allocator 208 may then determine whether to manage the region using an extent entry or a bitmap entry (e.g., whether to send the region to the extent handler 215 or to the bitmap handler 218 for processing).

When extent handler 215 receives a region, it generates a new extent for the received region, and adds an extent entry to an appropriate search tree (the search tree that manages regions having the identified offset) for the new extent. Since the search trees are indexed on offsets, the extent handler 215 places the extent entry as a child node or leaf of a current entry that has a closest offset to the new entry in the appropriate search tree. If the new entry has an offset that is smaller than the existing entry to which it is linked, it branches to the left of that entry. If the new entry has an offset that is larger than the existing entry, it branches to the right of the entry.

Bitmap handler 218 manages bitmap entries included in search trees. When bitmap handler 218 receives a new region of unallocated space, it first determines whether there is already an existing bitmap that can manage the region. If no such bitmap exists, the bitmap handler 218 generates a new bitmap, and adds the bitmap to an appropriate search tree. The bitmap handler 218 than sets one or more bits in the bitmap to indicate that the region is unallocated. If a bitmap already exists that can manage the region, the bitmap handler 218 merely sets one or more bits in that bitmap to indicate that the region is unallocated. Since the offset of the bitmap doesn't change, the bitmap does not need to be unlinked from the search tree to change what blocks managed by the bitmap are unallocated and what blocks are allocated.

In one embodiment, bitmap handler 218 generates and places bitmaps for managing regions of unallocated space according to a bitmap generation strategy. The bitmap generation strategy causes bitmap handler 218 to generate bitmaps of predesignated size, for managing predesignated regions. In one embodiment, each bitmap includes a number of bits equal to the memory page size of the underlying system (e.g., according to underlying processor architecture). The memory page is a fixed-length block of main memory that is contiguous in both physical memory addressing and virtual memory addressing. Typically, systems have a memory page size of 4 kb, though other memory page sizes are also possible. Each bit in a bitmap represents a single block in the file system (typically 4 kb).

The amount of storage space described by a bitmap can be determined in one embodiment according to the following algorithm:

$$BitMap_{size} = Page_{size} \cdot Block_{size} \quad \text{(equation 2)}$$

where $BitMap_{size}$ represents the amount of storage space described by a bitmap, $Page_{size}$ represents the memory page size and $Block_{size}$ represents the block size. Therefore, for 4 kb blocks (as is standard) and a 4 kb memory page size, the bitmap will describe 128 Mb of storage space.

In one embodiment, bitmap handler 218 divides the size of a block group by the amount of space described by a bitmap to determine the number of bitmaps needed to cover the entire block group. For example, a 1 Gb block group would be covered by approximately 32 bitmaps, each of which describe 128 Mb of storage space. In one embodiment, each bitmap has an offset that is equal to the offset of the first block that it describes. For example, the bitmap that describes the blocks from 0 Mb to 128 Mb would have an offset of 0 Mb.

A generated bitmap may be placed at an offset within a block group in a determinative fashion. In one embodiment, the following procedure is used to determine where to place a newly generated offset for managing a received region of unallocated storage space. When a region to be managed by a bitmap is received, the bitmap handler 218 subtracts the starting offset of the block group from the starting offset of the received region to determine the relative position within the block group of the received region. The bitmap handler 218 then divides this relative position by the number of bytes described by a single bitmap to determine placement order of the bitmap within the block group. The result is then rounded down to the nearest integer. The placement order (which is an integer) is then multiplied by the number of bytes described by the bitmap to determine the offset of the bitmap relative to the block group. Finally, the starting offset of the block group is added to the offset of the bitmap relative to the block group to determine the absolute placement of the bitmap.

In one embodiment, bitmap generation and placement can be computed using the following algorithm:

$$BitMap_{Offset} = \left\lfloor \frac{Region_{Offset} - BlockGroup_{Offset}}{BitMap_{size}} \right\rfloor \cdot BitMap_{size} + Region_{Offset} \quad \text{(equation 3)}$$

where $Bitmap_{offset}$ represents the absolute offset of the bitmap, $Region_{offset}$ represents the offset of the received region, and $BlockGroup_{offset}$ represents the offset of the block group.

In one embodiment, all bits of newly generated bitmaps are set to 0s. A newly generated bitmap is added to an appropriate search tree (the search tree that manages the regions of storage space covered by the bitmap) based on the offset of the bitmap. Once a bitmap that covers the received region has been generated and added to a search tree, the received region is subdivided into blocks, and the bit or bits representing each of those blocks are set to is to indicate that those blocks are free.

The following example illustrates bitmap generation using equation 2. Consider a region of free space that is received, where the region is the last block in a block group that is 1 Gb long and that starts at offset 1 Gb. Therefore, the received region starts at offset 2147479552, and is 4 kb long. Applying equation 2, we get:

$$BitMap_{Offset} = \left\lfloor \frac{2147479552 \text{ bytes} - 1 \text{ Gb}}{132 \text{ Mb}} \right\rfloor \cdot \quad \text{(equation 4)}$$

$$132 \text{ Mb} + 1 \text{ Gb}$$

$$= 2013265290 \text{ bytes}$$

Thus, in this example, a bitmap is generated that has an offset at 2013265290 bytes. The appropriate bit in this bitmap is then set to 1, which would be the last bit in the bitmap.

In one embodiment, a bitmap and an extent can have the same offset. Since offsets are quicker to search, where a bitmap and extent have the same offset, the extent entry branches to the left of the bitmap entry and/or the bitmap entry branches to the right of the extent entry. Therefore, when the search tree is navigated, the extent entry will be searched first.

In one embodiment, when a bitmap is generated, any extent entries that include regions of free space that are covered by the bitmap are deleted, and the bitmap is updated to show that the blocks that cover those regions are free. If an extent entry includes a region for which only a part of the region is covered by a bitmap, a new extent entry would be generated covering only the portion of the region not covered by the bitmap.

Note that though storage space has been divided into block groups in the preceding description, storage space may also be divided into other units of storage space. For example, in a storage space that does not include blocks, block groups may not be used. Instead, storage space may be divided, for example, based on offset addresses.

Figure 3:
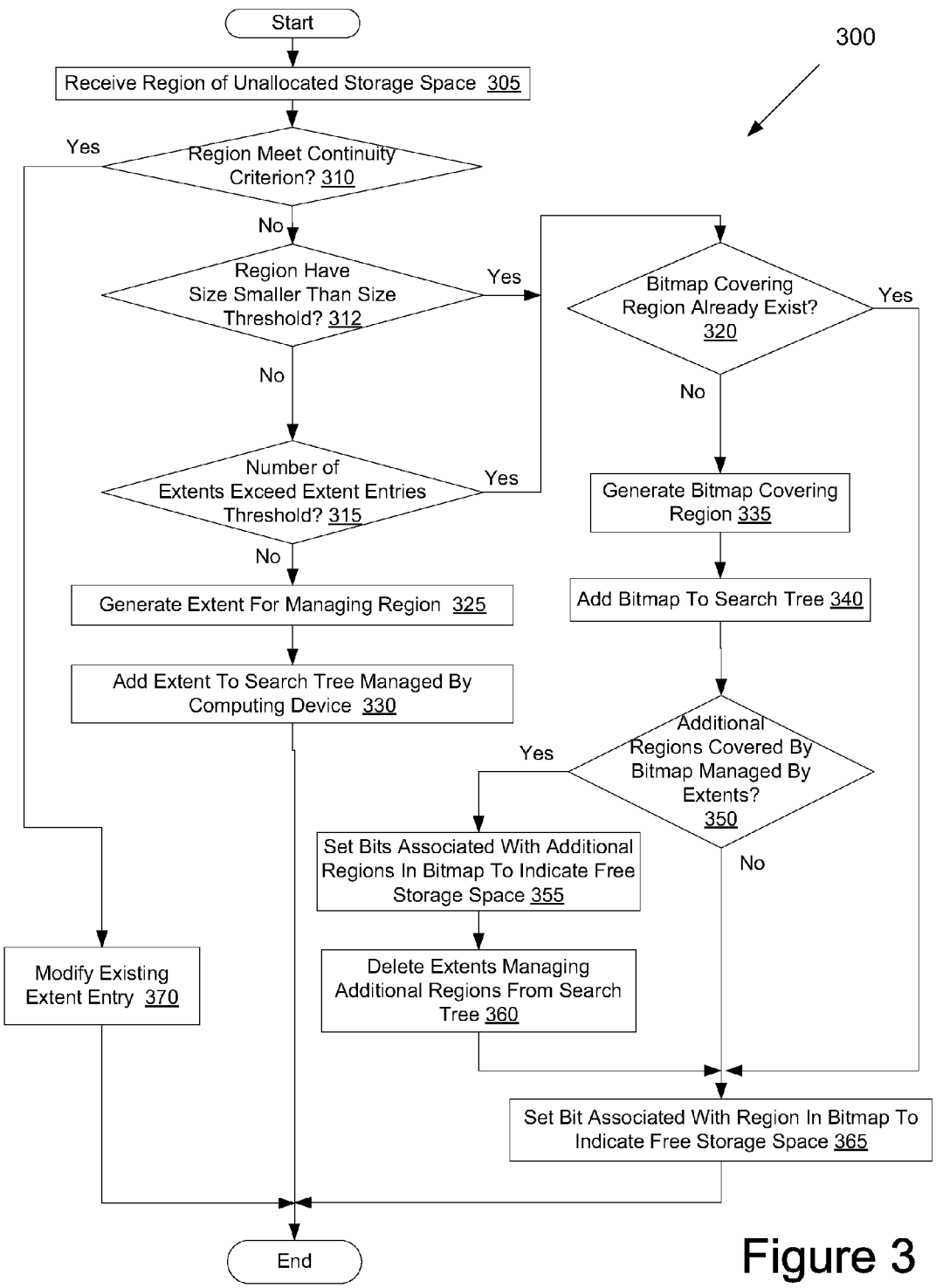
FIG. 3 illustrates a flow diagram of one embodiment for a method of managing regions of unallocated storage space.

FIG. 3 illustrates a flow diagram of one embodiment for a method 300 of managing regions of unallocated storage space. The method may be performed by processing logic that may comprise hardware (e.g., circuitry, dedicated logic, programmable logic, microcode, etc.), software (such as instructions run on a processing device), or a combination thereof. In one embodiment, method 300 is performed by storage space manager 210 of FIG. 2.

Referring to FIG. 3, at block 305 of method 300, a file system executing on a computing device receives a region of unallocated storage space. At block 310, the file system determines whether the region meets a continuity criterion. The region meets the continuity criterion if it is contiguous with a region of unallocated space that is managed by an existing extent entry. If the continuity criterion is satisfied, the method proceeds to block 370, the existing extent entry is modified to include the received region, and the method ends. If the continuity criterion is not satisfied, the method continues to block 312.

At block 312, the file system determines whether the region has a size that is smaller than a region size threshold. If the region has a size that is smaller than the region size threshold, the method proceeds to block 320. If the region has a size that is equal to or greater than the region size threshold, the method continues to block 315.

At block 315, the file system determines whether the number of extents included in a search tree that will manage the received region exceeds an extent entries threshold. If the number of extent entries exceeds the extent entries threshold, the method proceeds to block 320. If the number of extent entries is below the extent entries threshold, the method continues to block 325. In one embodiment, the extent entries threshold is a dynamic threshold that changes based on the number of bitmap entries included in the search tree. The extent entries threshold is described in greater detail above with reference to FIG. 2A.

At block 325, a new extent is generated for managing the received region. The new extent entry has an offset that is equal to the starting byte of the region, and a length that is equal to the length of the region. At block 330, a new extent entry is added to the search tree for the new extent. The method then ends.

At block 320, the file system determines whether there is an existing bitmap entry that covers the received region. If there is such an existing bitmap entry, the method proceeds to block 365. Otherwise, the method continues to block 335.

At block 335, the file system generates a bitmap that covers the received region. Bitmap generation is discussed at length above with reference to FIG. 2A. At block 340, a new bitmap entry is added to the search tree for the new bitmap. At block 350, the file system determines whether there are any additional regions of free space that are covered by the new bitmap entry, and which are currently managed by extent entries. If such regions exist, then the method continues to block 355. Otherwise, the method proceeds to block 365.

At block 355, the file system sets bits associated with the additional regions in the bitmap to indicate that those regions are unallocated. At block 360, the extents that had been managing those additional regions are removed from the search tree. The method then continues to block 365.

At block 365, the bit (or bits) in the bitmap that are associated with the received region are set to indicate that the region is unallocated. The method then ends.

Figure 4:
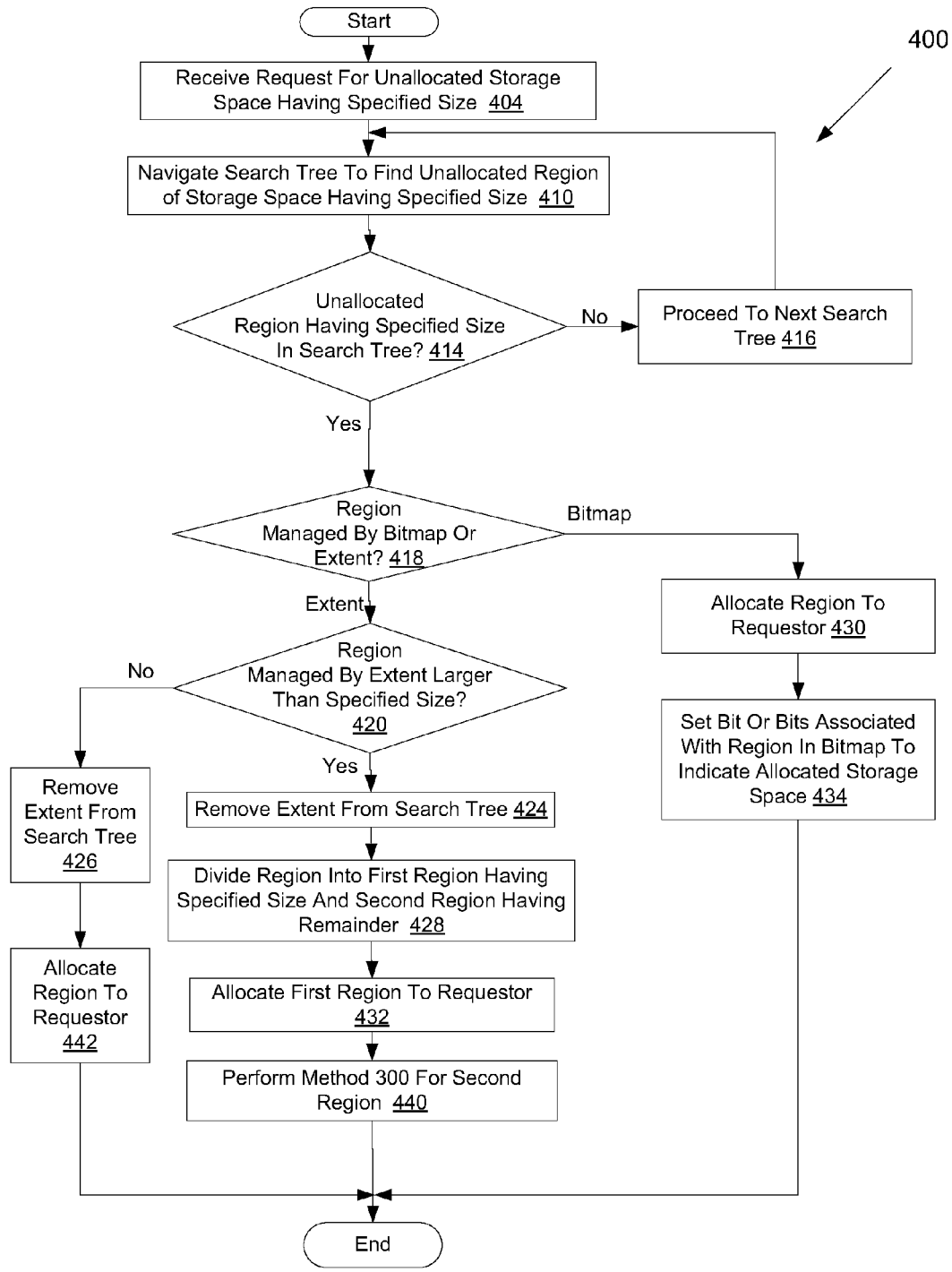
FIG. 4 illustrates a flow diagram of one embodiment for a method of allocating regions of unallocated storage space to a requestor.

FIG. 4 illustrates a flow diagram of one embodiment for a method 400 of allocating regions of unallocated storage space to a requestor. The method may be performed by processing logic that may comprise hardware (e.g., circuitry, dedicated logic, programmable logic, microcode, etc.), software (such as instructions run on a processing device), or a combination thereof. In one embodiment, method 400 is performed by storage space manager 210 of FIG. 2.

Referring to FIG. 4, at block 404 of method 400, a file system executing on a computing device receives a request for unallocated storage space having a specified size. The request may also include a specified offset. At block 410, the file system navigates a search tree that manages the specified offset to find an unallocated region of storage space having the specified size. At block 414, if no region having the specified size is found, the method continues to block 416, and the file system proceeds to a next search tree. If a region having the specified size is found, the method continues to block 418.

At block 418, if the region having the specified size is managed by an extent entry, the method continues to block 420. If the region is managed by a bitmap entry, the method continues to block 430.

At block 430, the file system allocates one or more blocks to the requestor, wherein the total number of blocks allocated have a total size that is at least the size specified in the request. At block 434, the file system sets the bit or bits in the bitmap associated with the block or blocks that were allocated to indicate that those blocks are no longer free. The method then ends.

At block 420, the file system determines whether the region managed by the extent entry is larger than the specified size. If the region is larger than the specified size, the method proceeds to block 424. Otherwise, the method advances to block 426.

At block 426, the extent entry for the region is removed from the search tree. At block 442, the region is allocated to the requestor. The method then ends.

At block 424, the file system removes the extent entry from the search tree. At block 428, the region is divided into a first region having the specified size and a second region having the remainder of the free space that had been included in the original region. At block 432, the file system allocates the first region to the requestor. At block 440, the file system performs method 300 to determine how to manage the second region. The method then ends.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    maintaining, by a computing device executing a file system, a search tree comprising a plurality of extents for managing a plurality of first regions of unallocated storage space and a plurality of bitmaps for managing a plurality of second regions of the unallocated storage space; and
    for each region of the unallocated storage space, determining whether to manage the region using an extent or a bitmap based on one or more space management criteria.

2. The method of claim 1, wherein each bit in the bitmap having a predetermined state identifies one of the second regions of the unallocated storage space.

3. The method of claim 1, wherein the search tree is a self-balancing binary search tree that is indexed on starting bytes of the plurality of first regions and the plurality of second regions.

4. The method of claim 1, further comprising:
    if a determination is made to manage a specific region of the unallocated storage space using a specific bitmap, and the specific bitmap for managing that specific region does not exist, generating the specific bitmap.

5. The method of claim 1, further comprising:
    if a determination is made to manage a specific region of the unallocated storage space using a specific bitmap, and the specific bitmap manages additional regions of the unallocated storage space,
    deleting an extent if any of the additional regions of the unallocated storage space are managed by the extent.

6. The method of claim 1, wherein the one or more space management criteria further comprise a size threshold, wherein a region that is smaller than the size threshold is managed by a bitmap.

7. The method of claim 1, wherein the one or more space management criteria further comprise an extent entries threshold, wherein if a total number of extent entries included in the search tree exceeds the extent entries threshold, the region is managed by a specific bitmap.

8. The method of claim 7, wherein the extent entries threshold is a variable threshold that changes as the number of bitmaps included in the search tree changes.

9. The method of claim 1, further comprising:
receiving a request for unallocated memory space having a specified size;
navigating the search tree linearly until a region having the specified size is located in an extent or in a bitmap; and
allocating the region.

10. A computing device, comprising:
a memory to store instructions for a file system; and
a processing device, connected to the memory, to execute the instructions, wherein the instructions cause the processing device to:
execute a search tree comprising a plurality of extents for managing a plurality of first regions of unallocated storage space and a plurality of bitmaps for managing a plurality of second regions of the unallocated storage space; and
for each region of the unallocated storage space, determine whether to manage the region using an extent or a bitmap based on one or more space management criteria.

11. The computing device of claim 10, wherein the search tree is a self-balancing binary search tree that is indexed on starting bytes of the plurality of first regions and the plurality of second regions.

12. The computing device of claim 10, wherein the instructions further cause the processor to:
generate a specific bitmap if a determination is made to manage a specific region of the unallocated storage space using the specific bitmap, and the specific bitmap for managing that specific region does not exist.

13. The computing device of claim 10, wherein the instructions further to cause the processor to:
if a determination is made to manage a specific region of the unallocated storage space using the specific bitmap, and the specific bitmap manages additional regions of the unallocated storage space, delete an extent if any of the additional regions of the unallocated storage space are managed by the extent.

14. The computing device of claim 10, wherein the one or more space management criteria comprise a size threshold, wherein a region that is smaller than the size threshold is managed by a bitmap.

15. The computing device of claim 10, wherein the one or more space management criteria further comprise an extent entries threshold, wherein if a total number of extent entries included in the search tree exceeds the extent entries threshold, the region is managed by a specific bitmap.

16. A computer readable storage medium including instructions that, when executed by a processing device, cause the processing device to perform a method comprising:
maintaining, by a computing device executing a file system, a search tree comprising a plurality of extents for managing a plurality of first regions of unallocated storage space and a plurality of bitmaps for managing a plurality of second regions of the unallocated storage space; and
for each region of the unallocated storage space, determining whether to manage the region using an extent or a bitmap based on one or more space management criteria.

17. The computer readable storage medium of claim 16, wherein the search tree is a self-balancing binary search tree that is indexed on starting bytes of the plurality of first regions and the plurality of second regions.

18. The computer readable storage medium of claim 16, the method further comprising:
if a determination is made to manage a specific region of the unallocated storage space using a specific bitmap, and the specific bitmap for managing that specific region does not exist, generating the specific bitmap.

19. The computer readable storage medium of claim 16, the method further comprising:
if a determination is made to manage a specific region of the unallocated storage space using a specific bitmap, and the specific bitmap manages additional regions of the unallocated storage space, deleting an extent if any of the additional regions of the unallocated storage space are managed by the extent.

20. The computer readable storage medium of claim 16, wherein the one or more space management criteria further comprise a size threshold, wherein a region smaller than the size threshold is managed by a bitmap.

21. The computer readable storage medium of claim 16, wherein the one or more space management criteria further comprise an extent entries threshold, wherein if a total number of extent entries included in the search tree exceeds the extent entries threshold, the region is managed by a specific bitmap.

* * * * *